United States Patent
Kim et al.

(10) Patent No.: US 9,005,077 B2
(45) Date of Patent: Apr. 14, 2015

(54) METHOD TO REDUCE LASH CLUNK IN A HYBRID ELECTRIC VEHICLE

(71) Applicant: GM Global Technology Operations LLC, Detroit, MI (US)

(72) Inventors: Min-Joong Kim, Troy, MI (US); Joseph M. Tolkacz, Novi, MI (US); R Travis Schwenke, Springboro, OH (US); Randall B. Dlugoss, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 10 days.

(21) Appl. No.: 13/925,813

(22) Filed: Jun. 24, 2013

(65) Prior Publication Data
US 2014/0024495 A1 Jan. 23, 2014

Related U.S. Application Data

(60) Provisional application No. 61/672,994, filed on Jul. 18, 2012.

(51) Int. Cl.
| | |
|---|---|
| *B60W 10/08* | (2006.01) |
| *B60W 10/02* | (2006.01) |
| *B60W 20/00* | (2006.01) |
| *B60K 6/52* | (2007.10) |
| *B60W 10/06* | (2006.01) |
| *B60K 6/26* | (2007.10) |

(52) U.S. Cl.
CPC .................. *B60W 10/06* (2013.01); *B60K 6/52* (2013.01); *B60K 2006/268* (2013.01); *B60W 10/02* (2013.01); *B60W 20/40* (2013.01); *B60W 2510/1005* (2013.01); *B60W 2710/0644* (2013.01); *B60Y 2300/63* (2013.01); *B60Y 2300/73* (2013.01); *Y02T 10/6265* (2013.01); *Y10T 477/71* (2013.01)

(58) Field of Classification Search
USPC .................. 477/3, 5, 110, 111, 84, 180, 175; 180/65.28
See application file for complete search history.

(56) References Cited

U.S. PATENT DOCUMENTS

| | | | | |
|---|---|---|---|---|
| 5,413,012 | A * | 5/1995 | Davis | 74/335 |
| 5,425,284 | A * | 6/1995 | Davis | 74/335 |
| 5,508,916 | A * | 4/1996 | Markyvech et al. | 701/51 |
| 5,974,354 | A * | 10/1999 | Janecke et al. | 701/64 |
| 8,079,936 | B2 * | 12/2011 | MacFarlane et al. | 477/109 |
| 2008/0305925 | A1 * | 12/2008 | Soliman et al. | 477/5 |
| 2010/0324762 | A1 * | 12/2010 | Imaseki et al. | 701/22 |
| 2011/0053734 | A1 * | 3/2011 | Kaltenbach et al. | 477/5 |
| 2012/0306457 | A1 | 12/2012 | Haggerty et al. | |
| 2013/0296108 | A1 * | 11/2013 | Ortmann et al. | 477/5 |
| 2014/0088805 | A1 * | 3/2014 | Tulpule et al. | 701/22 |

FOREIGN PATENT DOCUMENTS

JP    2008162315 A  *  7/2008

* cited by examiner

*Primary Examiner* — Roger Pang

(57) ABSTRACT

A hybrid transmission includes a transmission having a selectable clutch device effective when engaged to mechanically couple an internal combustion engine to a first axle at a fixed engine speed to axle speed ratio. A method for starting the engine includes executing an engine start event including spinning and fueling the engine such that an engine speed to axle speed ratio exceeds the fixed engine speed to axle speed ratio, and engaging said selectable clutch device after the engine speed to axle speed ratio exceeds the fixed engine speed to axle speed ratio.

21 Claims, 5 Drawing Sheets

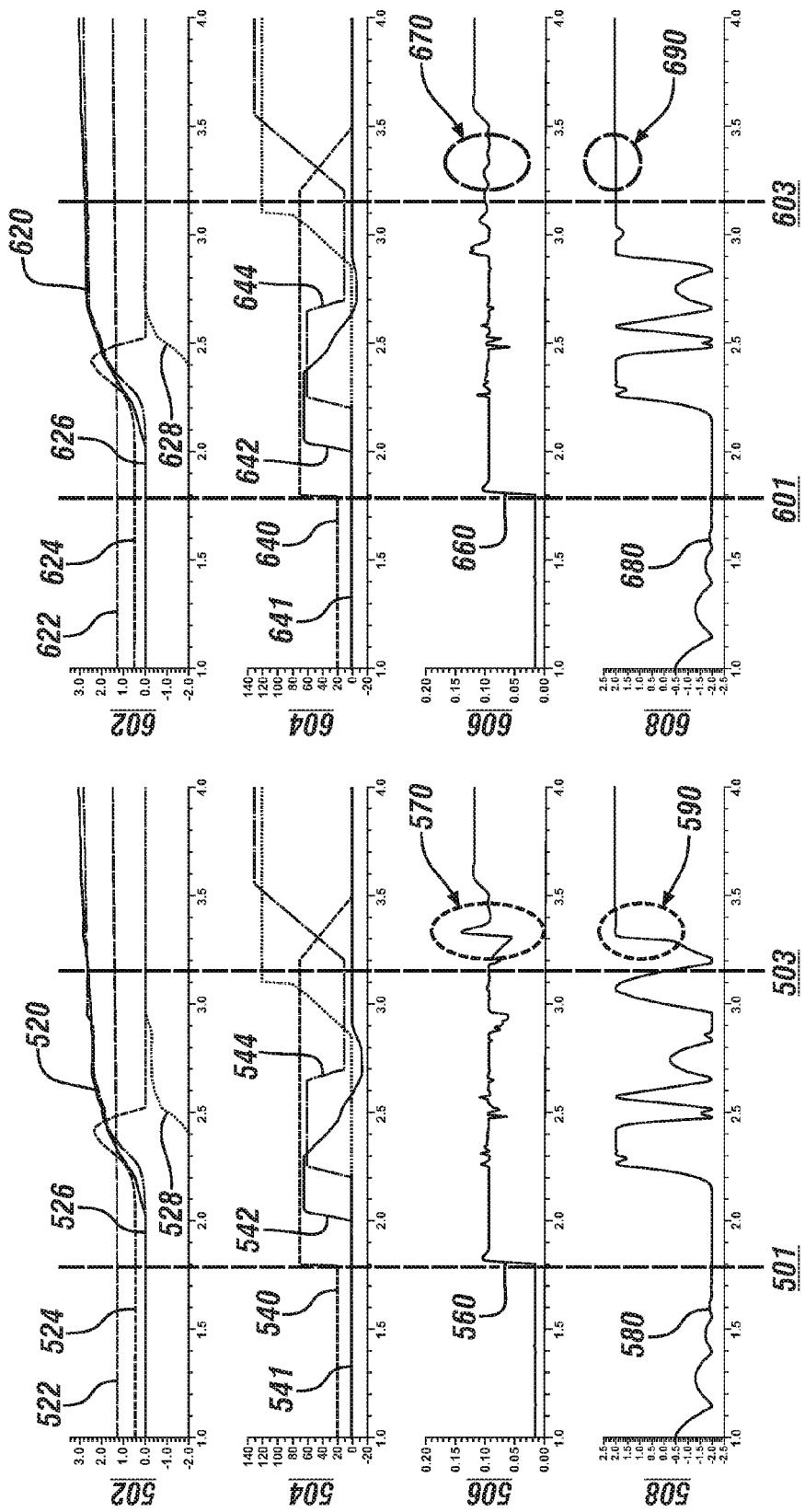

METHOD TO REDUCE LASH CLUNK IN A HYBRID ELECTRIC VEHICLE

CROSS REFERENCE TO RELATED APPLICATIONS

This application claims the benefit of U.S. Provisional Application No. 61/672,994, filed on Jul. 18, 2012, which is incorporated herein by reference.

TECHNICAL FIELD

This disclosure is related to powertrain systems employing two or more torque generative devices.

BACKGROUND

The statements in this section merely provide background information related to the present disclosure. Accordingly, such statements are not intended to constitute an admission of prior art.

Vehicle powertrain systems include one or more torque actuators coupled to a transmission that transfers torque to a driveline for tractive effort. Known torque actuators include internal combustion engines and electric machines. A known hybrid powertrain system employing an electric machine includes an electric machine coupled to a crankshaft of the engine to function as a torque actuator in place of an alternator. The electric machine can regenerate electrical energy for storage in an electrical energy storage device when the engine is in operation and can function as a starter for the engine. Another known powertrain system employing an electric machine includes an internal combustion engine coupled to a first axle of the vehicle and an electric machine coupled to a second axle of the vehicle. The electric machine can provide tractive torque to the second axle of the vehicle for enabling an electric mode of vehicle operation.

Meshed driveline components, e.g., transmission splines, a chain, a final drive, a differential and/or interleafed gear teeth on planetary gear sets, have clearances that are a result of manufacturing tolerances and component design specifications. Gear lash, i.e., play or slack in relative rotational positions of the meshed driveline components, results from the clearances between the meshed driveline components. When a vehicle is operating in an electric mode by an electric machine providing tractive torque to a rear axle of a vehicle, the front axle coupled to the engine may drag the vehicle transmission so that gear lash contact is present on a "braking" side of the meshed driveline components. When an engine is started and a desired gear ratio of the transmission is selected, gear lash contact changes onto a "driving" side of the meshed driveline components resulting in undesirable driveline clunk. It is desirable to eliminate undesirable driveline clunk when a hybrid powertrain transitions from an electric operating mode to an operating mode requiring the engine to be started for providing tractive torque to the front axle of the vehicle.

SUMMARY

A hybrid transmission includes a transmission having a selectable clutch device effective when engaged to mechanically couple an internal combustion engine to a first axle at a fixed engine speed to axle speed ratio. A method for starting the engine includes executing an engine start event including spinning and fueling the engine such that an engine speed to axle speed ratio exceeds the fixed engine speed to axle speed ratio, and engaging said selectable clutch device after the engine speed to axle speed ratio exceeds the fixed engine speed to axle speed ratio.

BRIEF DESCRIPTION OF THE DRAWINGS

One or more embodiments will now be described, by way of example, with reference to the accompanying drawings, in which:

FIG. 2 illustrates the hybrid powertrain system 10 of FIG. 1-1 when lash contact is occurring on a braking side of a lash element of a driveline during an electric vehicle (EV) mode, in accordance with the present disclosure;

FIG. 5 illustrates experimental and derived data depicting an engine start event utilizing a converging engine speed ramping profile for a powertrain system, in accordance with the present disclosure;

FIG. 6 graphically illustrates experimental and derived data depicting an engine start event utilizing an overshoot engine speed ramping profile for a powertrain system, in accordance with the present disclosure;

DETAILED DESCRIPTION

Figure 1:
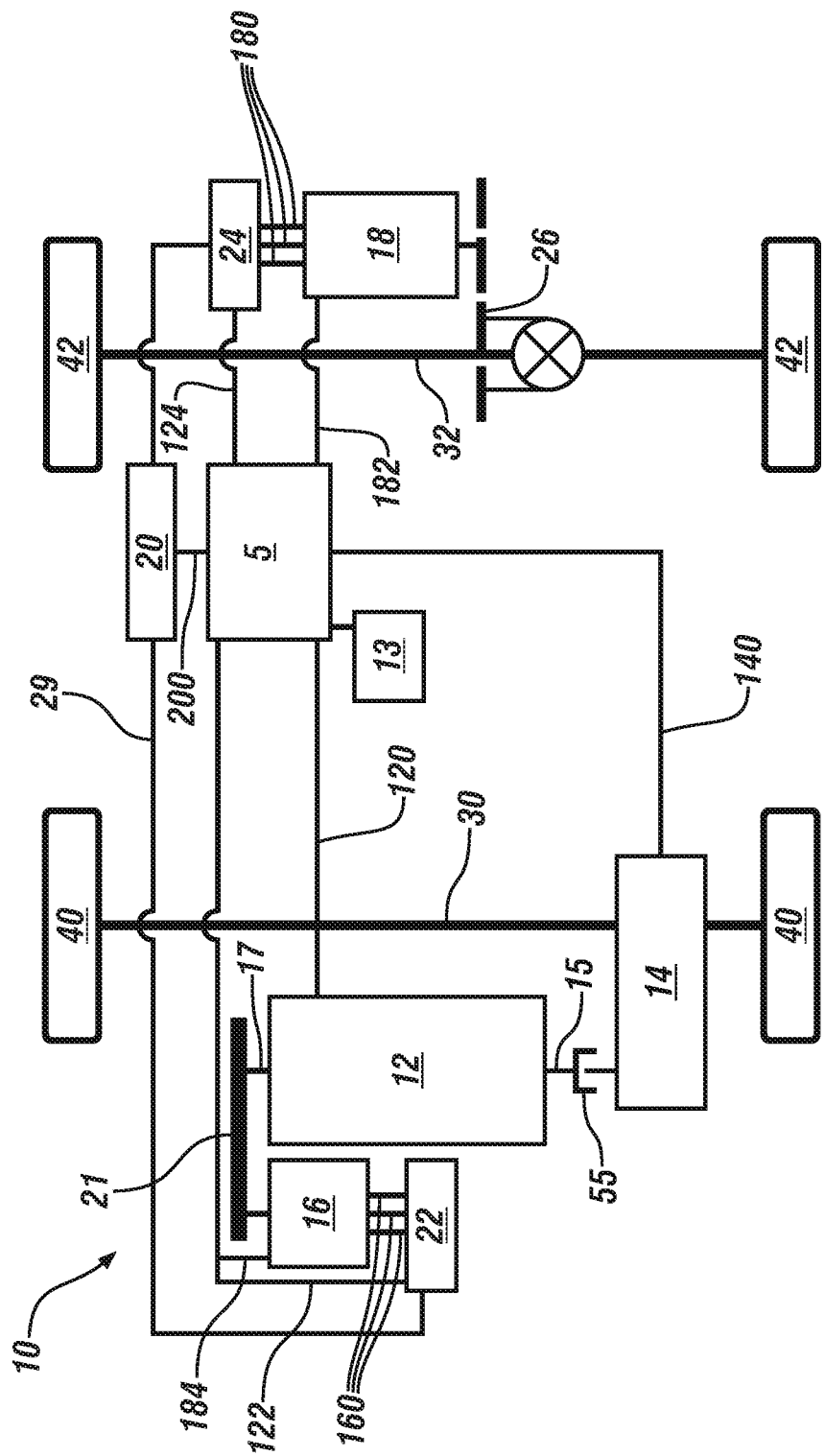
FIGS. 1-1 and 1-2 illustrate a vehicle including a hybrid powertrain system having a first electric machine mechanically coupled to an internal combustion engine and a second electric machine mechanically coupled to an axle of the vehicle, in accordance with the present disclosure.

Referring now to the drawings, wherein the showings are for the purpose of illustrating certain exemplary embodiments only and not for the purpose of limiting the same, FIG. 1-1 illustrates a vehicle including a hybrid powertrain system 10 including a first electric machine 18 mechanically coupled to a second axle 32 of the vehicle and a second electric machine 16 mechanically coupled to an internal combustion engine 12, in accordance with the present disclosure. The powertrain system 10 is controlled by a control module 5 that includes control schemes for controlling operation of the first and second electric machines 18, 16, respectively, and the engine 12.

In the exemplary embodiment, the hybrid powertrain system 10 includes the second electric machine 16 mechanically coupled to the engine 12 that mechanically couples to a hybrid transmission 14, via a torque converter 55 in an automatic transmission or a friction launch clutch pack in an automated manual transmission or a dual-clutch transmission. The second electric machine 16 preferably mechanically couples to the engine 12 via a mechanism 21 that mechanically couples to a crankshaft 17 of the engine 12 and provides a mechanical power path therebetween. The mechanism 21 may be a gearing mechanism or rotating shaft. The crankshaft 17 of the engine 12 is mechanically coupled to an output member 15 that mechanically couples to the transmission 14 via the torque converter 55. The transmission 14 includes an output member (e.g., see output member 27 of FIGS. 2 and 3) that couples to a first axle 30 of the vehicle driveline. Rotation of the first axle 30 rotates front vehicle wheels 40. In another embodiment, the mechanism 21 may be a belt-alternator-starter (BAS) mechanism that includes a serpentine belt routed between a pulley attached to the crankshaft 17 of the engine 12 and another pulley attached to a rotating shaft coupled to a rotor of the first electric machine 16. In an exemplary embodiment, BAS mechanism is a regenerative BAS system, wherein the second electric machine 16 can be enabled to regenerate electric energy for storage in an electrical energy storage (ESD) device 20 when the second electric machine 16 is not acting as a motor. In an exemplary embodiment, the first axle 30 corresponds to a front axle and a second axle 32 corresponds to a rear axle. Alternative embodiments can include the first axle 30 corresponding to a rear axle and the second axle 32 corresponding to a front axle.

The engine 12 is preferably a multi-cylinder internal combustion engine that converts fuel to mechanical power through a combustion process. The engine 12 is equipped with a plurality of actuators and sensing devices for monitoring operation and delivering fuel to form a combustion charge to produce torque that is responsive to an operator torque request. The engine 12 is configured to execute autostart and autostop control schemes and a fuel cutoff (FCO) control scheme during ongoing operation of the vehicle. In an exemplary embodiment, the engine 12 is preferably started by the second electric machine 16 in response to the engine start event. In an alternative embodiment, a low-voltage solenoid-actuated electrical starter can be employed for starting the engine in response to the engine start event. The engine 12 is considered to be in an OFF state when it is not being fueled and is not spinning. The engine 12 is considered to be in an FCO state when it is spinning but is not being fueled. Accordingly, the second electric machine 16 can operate as a generator when the engine is spinning fueled or unfueled. The autostart event may be executed subsequent to executing an autostop event to start or restart engine operation during ongoing powertrain operation. The engine 12 may be started to transfer tractive torque to the first axle 30 and/or to provide power to the second electric machine 16 to generate electric energy that may be stored in the ESD 20. The ESD 20 can be a high-voltage battery. The powertrain system 10 can use any combination of high-voltage and low-voltage energy storage devices for powering any device of the vehicle.

The second electric machine 16 is preferably a multi-phase electric motor/generator configured to convert stored electric energy to mechanical power and convert mechanical power to electric energy that may be stored in the ESD 20. In one embodiment, the second electric machine 16 acts as an alternator by converting mechanical power from the engine 12 to electric energy that may be stored in the ESD 20, wherein the engine 12 can be in an ON state, i.e., spinning and fueled, or the FCO state, i.e., spinning and unfueled. In another embodiment, the second electric machine 16 acts a generator during a regenerative control scheme by converting mechanical power from the transmission 14 to electric energy that may be stored in the ESD 20. In another embodiment, the second electric machine 16 acts as a starter for starting the engine 12 in response to an engine start event. The second electric machine 16 includes a rotor and a stator and an accompanying resolver. The resolver is a variable reluctance device including a resolver stator and a resolver rotor that are assembled onto the rotor and stator, respectively, of the second electric machine 16.

The first electric machine 18 is preferably a multi-phase electric motor/generator configured to convert stored electric energy to mechanical power and convert mechanical power to electric energy that may be stored in the ESD 20, e.g., a high-voltage battery. The first electric machine 18 is mechanically coupled to the second axle 32 of the vehicle via a gearing device 26. The first electric machine 18 is configured to provide tractive torque to the second axle 32 mechanically coupled to rear vehicle wheels 42 for driving the vehicle. When the engine is in an OFF state, the vehicle may operate in an electric vehicle (EV) mode utilizing the second electric machine 18. In one embodiment, the engine 12 can be started during the EV mode in response to an engine start event, such as when an operator tips into an accelerator pedal requesting additional torque. Concurrently, the transmission 14 can be shifted into a desired fixed gear state from the neutral state upon starting the engine 12. As used herein, the term "fixed gear state" refers to a fixed gear ratio between a transmission input speed and a transmission output speed, wherein each fixed gear state of a transmission includes a respective fixed gear ratio. Accordingly, the terms "fixed gear state" and "fixed gear ratio" may be used interchangeably herein unless otherwise stated. The first electric machine 18 includes a rotor and a stator and an accompanying resolver. The resolver is a variable reluctance device including a resolver stator and a resolver rotor that are assembled onto the rotor and stator, respectively, of the first electric machine 18.

The ESD 20 electrically connects to a first inverter module 24 and a second inverter module 22 via a high-voltage DC bus 29 to provide high-voltage DC electric power in response to control signals 122 and 124 originating in the control module 5. The first inverter 24 electrically connects the first electric machine 18 via a first multi-phase power bus 180. The second inverter 22 electrically connects to the second electric machine 16 via a second multi-phase power bus 160. The first and second inverters 24, 22, respectively, are configured with suitable control circuits including power transistors for transforming high-voltage DC electric power to high-voltage AC electric power and transforming high-voltage AC electric power to high-voltage DC electric power. The first and second inverters 24, 22, respectively, preferably employ pulsewidth-modulating control to convert stored DC electric power originating in the ESD 20, e.g., high-voltage battery, to AC electric power to drive the first and second electric machines 18, 16, respectively, to generate torque. Similarly, the first and second inverters 24, 22, respectively, convert mechanical power transferred to respective ones of the first and second electric machines 18, 16, respectively, to DC electric power to generate electric energy that is storable in the ESD 20 as part of a regenerative control strategy. It is appreciated that the first and second inverters 24, 22, respectively, are configured to receive motor control commands via signals via signals 124 and 122, respectively, for controlling inverter states to provide the motor drive and regeneration functionality.

The transmission 14 preferably includes one or more differential gear sets and controllable clutches configured to effect torque transfer in one of a plurality of fixed gear operating states over a range of speed ratios between the engine 12 and the axle speed of the first axle 30. It will be appreciated that the axle speed can correspond to an output speed of the transmission 14. Each fixed gear operating state includes a respective fixed engine speed to axle speed ratio. The transmission 14 includes any suitable configuration, and is preferably configured as an automatic transmission including two clutches to automatically shift between the fixed gear operating states to operate at a fixed gear ratio that achieves a preferred match between an operator torque request and an engine operating point. It will be appreciated that at least one of the clutches is engaged during operation in each of the fixed gear operating states, wherein each fixed gear operating state includes a respective fixed gear ratio. The aforementioned engine operating point can be based on vehicle speed. In an exemplary embodiment, the transmission 14 may shift from a neutral state to a desired fixed gear ratio when the engine is started in response to an engine start event while the vehicle is moving during the EV mode. The term "desired fixed gear ratio" can be interchangeably referred to as a "desired fixed engine speed to axle speed ratio." The transmission 14 automatically executes upshifts to shift to a fixed gear operating state having a lower numerical multiplication ratio (e.g., fixed gear ratio) between the engine speed and the axle speed of the first axle 30, and executes downshifts to shift to a fixed gear operating state having a higher numerical multiplication ratio. A transmission upshift requires a reduction in engine speed so the engine speed matches transmission output speed (e.g., axle speed) multiplied by the fixed gear ratio at a gear ratio associated with the desired fixed gear operating state. A transmission downshift requires an increase in engine speed so the engine speed matches transmission output speed (e.g., axle speed) multiplied by the gear ratio at a gear ratio associated with the desired fixed gear operating state. An inaccurate matching of engine speed and torque with transmission speed and torque may result in a sag or pull in vehicle speed or torque output, or clutch slippage upon execution of a transmission shift event. It will be further appreciated that while the term "fixed gear operating state" is used, embodiments herein may include operating modes such as a torque assist mode at which an assisted tractive torque is provided by the first electric machine 18 to the second axle 32 in addition to tractive torque provided by the engine 12 at one of the fixed gear ratios of the transmission 14.

Embodiments are directed toward the transmission 14 shifting from a neutral state to a desired fixed gear ratio when the engine is started while the vehicle is moving during the EV mode. A control strategy is implemented to reduce undesirable driveline clunk that results due to a change in gear lash contact from a "braking" side to a "driving" side of a lash element of the driveline. The change in gear lash contact can result any time the engine is started during an autostart event and the transmission 14 changes from a neutral state to the desired fixed gear ratio upon synchronization and engagement of at least one clutch of the transmission 14 to achieve the desired fixed gear ratio.

The first and second axles 30, 32, respectively, may each include a differential gear device mechanically coupled to a half-shaft of the respective axle that mechanically couples to a respective wheel 40 or 42 in one embodiment. The first axle 30 transfers tractive power between the transmission 14 and the road surface. The second axle 32 transfers tractive power between the first electric machine 18 and the road surface.

The control module 5 preferably signally and operatively connects to individual elements of the hybrid powertrain system 10 either directly or via a communications bus. The control module 5 signally connects to the sensing devices of each of the ESD 20 via signal 200, the first inverter module 24 via signal 124, the second inverter module 22 via signal 122, the first electric machine 18 via signal 182, the second electric machine 16 via signal 184, the engine 12 via signal 120, and the transmission 14 via signal 140 to monitor operation and determine parametric states thereof. An operator interface 13 of the vehicle includes a plurality of human/machine interface devices through which the vehicle operator commands operation of the vehicle, including, e.g., an ignition switch to enable an operator to crank and start the engine 12, an accelerator pedal, a brake pedal, a transmission range selector (PRNDL), a steering wheel, and a headlamp switch. One vehicle operator command of interest is the output torque request, which may be determined via operator inputs to the accelerator pedal and the brake pedal. Vehicle speed can be determined by monitoring one or more of the sensing devices. For instance, the vehicle speed can be determined by measuring the rotational velocity of the output shaft of the transmission.

The hybrid powertrain system 10 includes a communications scheme to effect communications in the form of sensor signals and actuator command signals between the control module 5 and elements of the powertrain system 10. It is appreciated that the communications scheme effects information transfer to and from the control module 5 using one or more communications systems and devices, including, e.g., the communications bus, a direct connection, a local area network bus, a serial peripheral interface bus, and wireless communications.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other suitable components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event. Alternatively, routines may be executed randomly.

The powertrain system 10 is configured to operate in one of a plurality of operating modes, including an EV mode, a torque assist mode and a fixed gear state. In the EV mode, the first electric machine 18 is providing tractive torque to the second axle 32 to drive the rear wheels 42. The engine is not providing any torque to the transmission 14 or the first axle 30, and therefore, is in the OFF state or the FCO state. The transmission 14 is in a neutral state. Accordingly, engine operation is terminated and the transmission 14 is commanded to the neutral state when the EV mode is commanded by the control module 5 via signal 140. It will be appreciated that the vehicle may operate in the EV mode when the vehicle is within a predetermined speed range. During operation in the EV mode, an engine start event can be executed in response to detecting a predetermined condition. In one embodiment, the predetermined condition can be detected when higher speeds exceeding an upper limit (e.g., vehicle speed threshold) of the predetermined speed range are required. Accordingly, when the vehicle speed exceeds the vehicle speed threshold, the engine can be started on the fly during the EV mode. In another embodiment, the predetermined condition can be detected when an output torque request exceeds a predetermined output torque request regardless of whether the vehicle speed has exceeded vehicle speed threshold or not. In yet another embodiment, the predetermined condition can be detected when a state of charge (SOC) of the ESD 20 is less than a SOC threshold. Accordingly, when the SOC of the ESD is less than the SOC threshold, execution of the engine start event can be executed/commanded. It will be appreciated that embodiments herein are directed towards execution of the engine start event any time the vehicle is moving in the EV mode. This disclosure is not limited to detecting one of the aforementioned predetermined conditions that may dictate the engine start event. In the torque assist mode, the engine 12 is providing tractive torque to the front wheels 40 through a fixed gear ratio within the transmission 14 and the first electric machine 18 is providing an assisted tractive torque to the rear wheels 42. The powertrain system 10 can be further configured to operate in the fixed gear ratio (e.g., fixed gear state) with tractive torque only being provided by the engine 12. Embodiments discussed herein are concerned with reducing or eliminating clunk that occurs when lash contact transitions from the braking side of a lash element of the driveline during the EV mode to the driving side of the lash element of the driveline once the engine is started and the desired fixed gear ratio within the transmission 14 is achieved through synchronization and engagement of at least one rotating clutch within the transmission. The desired fixed gear ratio can be any one of the fixed gear ratios within the transmission 14 based on matching an operator torque request and vehicle speed. As aforementioned, each fixed gear ratio corresponds to a fixed engine speed to axle speed ratio.

Figures 1, 2:
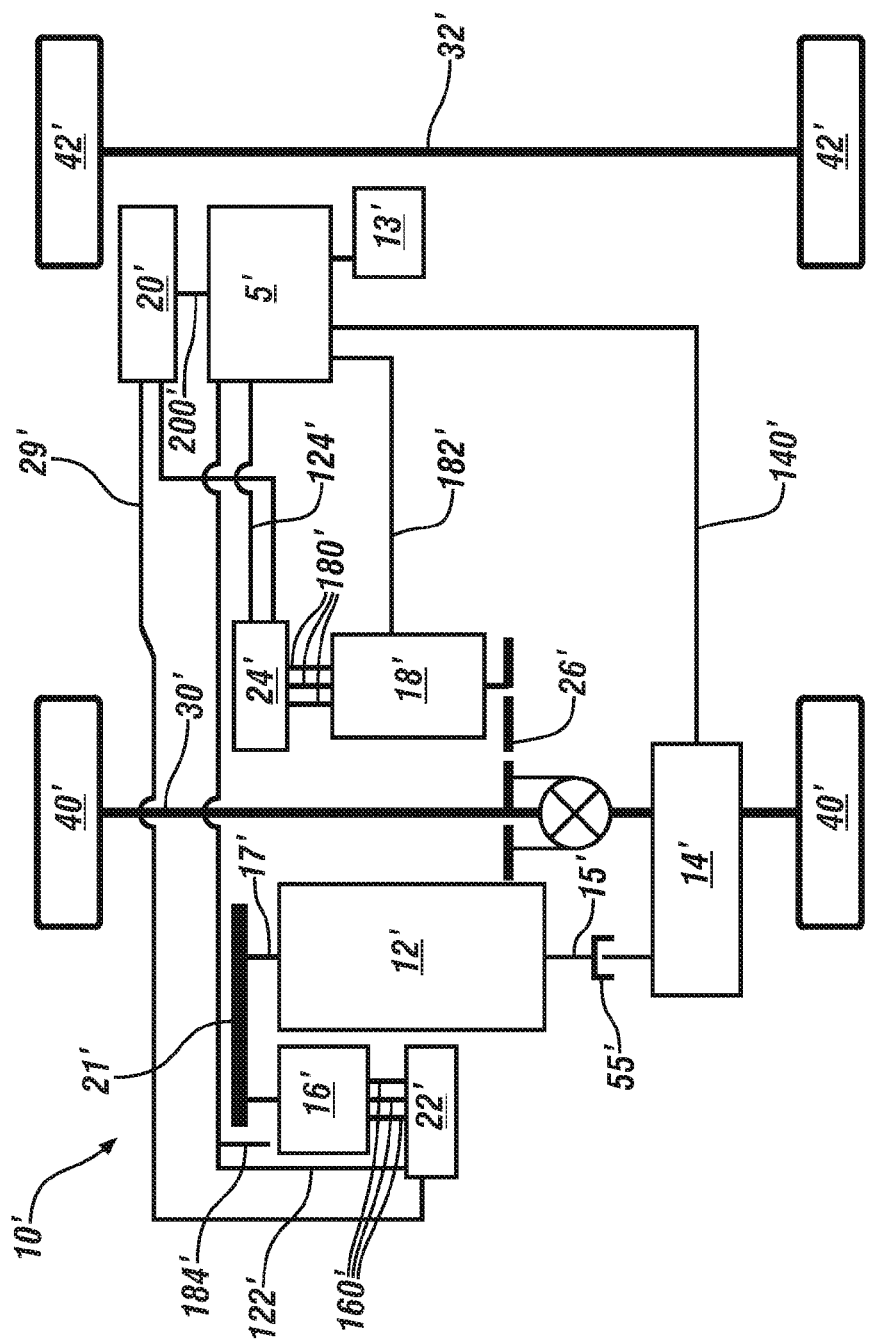
Figure 2:
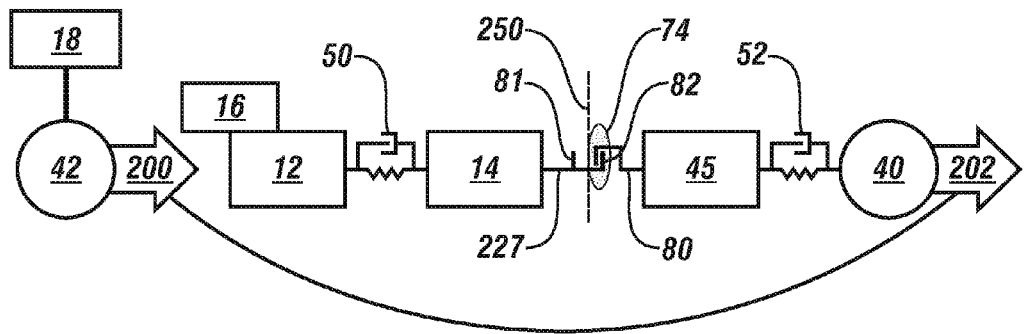

FIG. 1-2 illustrates another exemplary embodiment of the vehicle including the hybrid powertrain system 10' including the first electric machine 18 mechanically coupled to the first axle 30' of the vehicle and the second electric machine 16' mechanically coupled to the internal combustion engine 12', in accordance with the present disclosure. Like numbers of FIG. 1-2 refer to like features of FIG. 1-1. The illustrated embodiment of FIG. 1-2 is substantially similar to the embodiment illustrated in FIG. 1-1 except that the first electric machine 18' is mechanically coupled to the first axle 30' as opposed to being mechanically coupled to the second axle 32'. For instance, the first electric machine 18' is mechanically coupled to the first axle 30' of the vehicle via the gearing device 26'. The first electric machine 18' is configured to provide tractive torque to the first axle 30' mechanically coupled to vehicle wheels 42 for driving the vehicle. As aforementioned, the first axle 30' includes one of the front axle and the rear axle. Embodiments described herein will be referenced toward the hybrid powertrain system 10 of FIG. 1-1; however, it will be appreciated that the embodiments described herein are equally applicable to the hybrid powertrain system 10' of FIG. 1-2.

FIG. 2 illustrates the powertrain system 10 of FIG. 1-1 when lash contact is occurring on the braking side of a lash element 80 of a driveline during the EV mode, in accordance with the present disclosure. The lash element 80 is non-limiting and is depicted for illustrative purposes only. The lash element 80 can include any element of meshed driveline components such as transmission splines, a chain, a final drive, a differential, and/or interleafed gear teeth on planetary gear sets. In the illustrative embodiment, lash contact on the "braking side" of the lash element 80 occurs when the lash element 80 is to the right of dashed vertical line 250 and is in contact with a braking element 82. For illustrative purposes to distinguish between the lash element 80 and the braking element 82, a small gap between the lash element 80 and the braking element 82 exists; however, it is appreciated that the lash element and the braking element 82 are in contact with one another. The braking element 82 and a driving element 81 can be elements of either one of an output shaft 27 of the transmission 14 and final drive components 45. Like numerals refer to like elements of FIG. 1-1. The powertrain system 10 further includes engine damping components 50 disposed between the engine 12 and the transmission 14, the final drive components 45 of the driveline, a differential 52 of the driveline and the illustrative non-limiting lash element 80 of the driveline coupled to the output shaft 27 of the transmission 14. The final drive components 45 can include a chain, a final drive and/or interleafed gear teeth on planetary gear sets. In the illustrated embodiment, the lash element 80 is coupled at a first end to the output shaft 27 of the transmission 14 and the final drive components 45 at a second end. The driveline may collectively include the lash element 80, the final drive components 45 and the differential 52. In the EV mode of FIG. 2, the first electric machine 18 is providing motive or tractive torque to the second axle 32 for propelling the vehicle. Accordingly, a driving force 200 is provided to the rear wheels 42. At the same time, the front wheels 40 are providing a dragging force 202 that drags the transmission 14 resulting in gear lash contact 74 present on the braking side of the lash element 80 of the driveline. In the illustrated embodiment, the transmission 14 is in a neutral state having no rotating clutches engaged within the transmission 14. As aforementioned, gear lash is a play or slack in relative rotational positions of meshed driveline components such as transmission splines, chain, final drive, differential, and interleafed gear teeth on planetary gear sets.

Figure 3:
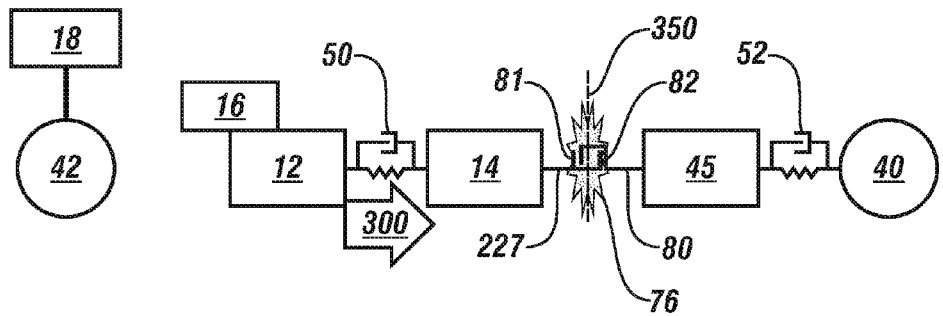
FIG. 3 illustrates the hybrid powertrain system 10 of FIG. 1-1 when lash contact is occurring on a driving side of a lash element of a driveline after a transition from the EV mode to one of a torque assist mode and a fixed gear state, in accordance with the present disclosure.

FIG. 3 illustrates the powertrain system 10 of FIG. 1-1 when lash contact is occurring on the driving side of the non-limiting lash element 80 of the driveline after a transition from the EV mode to one of the torque assist mode and the fixed gear state, in accordance with the present disclosure. Transitioning from the EV mode requires the engine to be started on the fly while the vehicle is in motion and a desired fixed gear ratio to be selected based on the vehicle speed and requested torque. As aforementioned, the desired fixed gear ratio includes a desired fixed engine speed to axle speed ratio based on a monitored output torque request and a monitored vehicle speed. The engine 12 can be started with the second electric machine 16 and follows a speed ramping profile to achieve a synchronized input speed. Accordingly, the synchronized input speed must be achieved such that at least one rotating clutch within the transmission 14 is synchronized for engagement to achieve the desired fixed gear ratio. Engine torque 300 is provided to the transmission 14. In the illustrative embodiment, the transition is in response to detecting at least one of the aforementioned predetermined conditions requiring a transition from the EV mode to one of the torque assist mode and the fixed gear state. Once the desired fixed gear ratio is achieved, i.e., the at least one clutch is engaged, the gear lash contact 74 present on the braking side of the lash element 80 of the driveline (FIG. 2) changes to gear lash contact 76 on the driving side of the lash element 80 of the driveline in response to the engine torque 300. In the illustrative embodiment, lash contact on the "driving side" of the lash element 80 occurs when the lash element 80 is to the left of dashed vertical line 350 and is in contact with the driving element 81. For illustrative purposes to distinguish between the lash element 80 and the driving element 81, a small gap between the lash element 80 and the driving element 81 exists; however, it is appreciated that the lash element 80 and the driving element 81 are in contact with one another. As aforementioned, the braking element 82 and the driving element 81 can be elements of either one of the output shaft 27 and the final drive components 45. When the change to the gear lash contact 76 on the driving side of the lash element 80 occurs abruptly upon engagement of the at least one rotating clutch, undesirable transmission clunk occurs, resulting in decreased drivability of the vehicle. Accordingly, it is desirable to eliminate this undesirable transmission clunk when the powertrain system 10 transitions from the EV mode to one of the torque assist mode and the fixed gear state.

Figure 4:
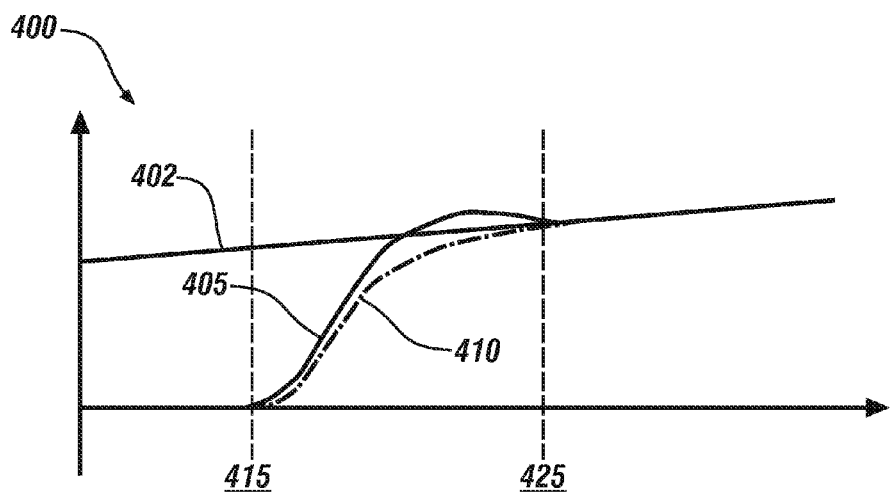
FIG. 4 illustrates engine speed versus time during an engine start event for a powertrain system, in accordance with the present disclosure.

FIG. 4 illustrates a plot for controlling engine input speed to a vehicle transmission during an engine start event for a powertrain system, in accordance with the present disclosure. The powertrain system can include the hybrid powertrain system 10 described with reference to FIG. 1-1. Plot 400 illustrates overshoot and converging engine speed ramping profiles 405, 410, respectively, for starting the engine on the fly when a transition from an EV mode to one of a torque assist mode and a fixed gear state is executed. The horizontal x-axis denotes time in seconds and the vertical y-axis denotes engine speed in RPM. An engine start event is executed at vertical line 415 and a desired fixed gear ratio is achieved, e.g., the at least one rotating clutch is engaged, at vertical line 425. As used herein, the term "desired fixed gear ratio" refers to a desired fixed engine speed to axle speed ratio. A synchronized engine input speed profile 402 represents a desired engine speed input to the transmission to enable synchronization of the at least one rotating clutch of the transmission to achieve the desired fixed gear ratio when the at least one rotating clutch is engaged. The synchronized engine input speed profile 402 can be determined as follows:

$$\text{synchronized input speed}=\text{output speed}*\text{desired fixed gear ratio} \quad [1]$$

wherein output speed is the speed of the transmission output, and desired fixed gear ratio is one of the fixed gear ratios of the transmission based on the output speed and an operator torque request.

The term "output speed" of Eq. 1 can be expressed as the axle speed of the first axle 30 of FIG. 1-1. The converging engine speed ramping profile 410 is configured to increase until it converges with the synchronized engine input speed profile 402, wherein the at least one rotating clutch is synchronized, and subsequently, engaged at vertical line 425. When utilizing the converging engine speed ramping profile 410, it will be appreciated that a dragging force (i.e., dragging force 202 of FIG. 2) is dragging the transmission resulting in gear lash contact present on the braking side of the lash element 80 prior to engagement of the at least one rotating clutch at vertical line 425. Subsequently, the gear lash contact present on the braking side of the lash element of the driveline transitions to gear lash contact present on the driving side of the lash element of the driveline due to the engine torque (i.e., engine torque 300 of FIG. 3) when the at least one rotating clutch is engaged at vertical line 425 resulting in undesirable transmission clunk.

The overshoot engine speed ramping profile 405 is configured to overshoot the synchronized engine input speed profile 402, wherein the at least one rotating clutch is synchronized, and subsequently, engaged after the engine speed is greater than the synchronized engine input speed profile 402 (e.g., the desired engine speed). One will appreciate that the desired engine speed can be expressed as the desired fixed engine speed to output speed (e.g., axle speed) ratio that is effective when the at least rotating clutch is engaged utilizing Eq. 1. In one embodiment, the at least one rotating clutch is engaged after the engine speed exceeds the desired engine speed (e.g., synchronized engine input speed profile 402) by a predetermined magnitude. In a non-limiting example, the predetermined magnitude is 50 RPM. It will be appreciated that when the at least one rotating clutch is engaged at vertical line 425 when utilizing the overshoot engine speed ramping profile 405, the engagement of the at least one clutch is already grabbing the engine side and the engine inertial torque will ensure lash contact to be present on the driving side of the lash element 80 of FIGS. 2 and 3. Therefore, transmission clunk is reduced or eliminated when utilizing the overshoot engine speed ramping profile.

FIG. 5 graphically illustrates experimental and derived data depicting an engine start event utilizing a converging engine speed ramping profile for a powertrain system, e.g., the hybrid powertrain system 10 described with reference to FIG. 1-1, in accordance with the present disclosure. The converging engine speed ramping profile is described with reference to the converging engine speed ramping profile 410 of FIG. 4. The horizontal x-axis in each of plots 502, 504, 506 and 508 denotes time in seconds. Dotted vertical line 501 represents execution of an engine start event. The engine start event can be executed in response to detecting at least one of the aforementioned predetermined conditions. The engine is in an OFF state or FCO state to the left of dotted line 501 and the transmission is in a neutral state. Dotted vertical line 503 represents an end of synchronization for the at least one rotating clutch to be engaged for achieving the desired fixed gear ratio. Dotted vertical line 503 can represent the point in time at which the at least one rotating clutch is engaged for achieving the desired fixed gear ratio, e.g., the desired fixed engine speed to axle speed ratio. The engine is in an ON state to the right of dotted vertical line 503 and the transmission is in the desired fixed gear ratio based on the output speed. Accordingly, the powertrain can operate in one of the torque assist mode and the fixed gear state to the right of dotted vertical line 503.

Referring to plot 502, the vertical y-axis denotes speed in RPM. Speed profile 520 is an engine speed, speed profile 522 is an output speed, speed profile 524 is a speed of a first rotating clutch, speed profile 526 is a transmission input speed and speed profile 528 is speed of a second rotating clutch. The speed profile 520 of the engine speed is the converging engine speed ramping profile. It will be appreciated, that at least one of the first and second rotating clutches are to be engaged within the transmission to achieve a fixed engine speed to axle speed (i.e., transmission output speed) ratio that corresponds to the desired fixed gear ratio of the transmission based on monitored output torque request and a monitored vehicle speed once the engine is started. A desired engine speed, i.e., a synchronized engine input speed, can be determined based on the output speed profile 522 and the desired fixed gear ratio utilizing Eq. [1]. The speed profile 520 (i.e., engine speed) begins to increase as it is being spun by a first electric machine, e.g., first electric machine 16 of FIG. 1-1. The speed profile 526 (i.e., transmission input speed) closely mimics the speed profile 520 but is not identical due to a torque converter mechanically coupled between the engine and the transmission.

Referring to plot 504, the vertical y-axis denotes torque in Newton-meters (Nm). Torque profile 540 is torque output from an electric machine, e.g., first electric machine 18 of FIG. 1-1. Torque profile 541 is torque capacity of the second rotating clutch, torque profile 542 is output torque of the electric machine and torque profile 544 is output torque of the engine. The torque profile 540 is positive because the powertrain system is operating in an EV mode prior to vertical line 501, and therefore, motive torque is being applied to a second axle, e.g., second axle 32 of FIG. 1-1, of the vehicle by the electric machine. At 2.0 seconds, the torque profile 542 increasingly ramps up indicating the electric machine is applying an output torque to the engine for spinning and cranking the engine during the engine start event. At 2.2 seconds, the torque profile 544 increasingly ramps up indicating combustion being initiated within in the engine. At 3.3 seconds, the torque profile 544 increasingly ramps up again after engagement of the at least one rotating clutch indicating engine operation in an ON state. Accordingly, with reference to plot 502, the speed profile 520 of the engine is increased according to a converging ramping profile beginning at 2.0 seconds.

Referring to plot 506, the vertical y-axis denotes gravity in G's. Profile line 560 represents vehicle acceleration. As illustrated at about 3.3 seconds, transmission clunk is present within area 570 due to the engine torque ramping up subsequent to engagement of the second rotating clutch and lash contact transitioning to the driving side of a lash element, e.g., lash element 80 of FIGS. 2 and 3, of the driveline.

Referring to plot 508, the vertical y-axis denotes vertical force in degrees. Profile line 580 represents transmission lash. A negative value represents lash contact on the braking side of the lash element, e.g., lash element 80 of FIGS. 2 and 3. A positive value represents lash contact on the driving side of the lash element. At about 3.3 seconds, a transition 590 from lash contact on the braking side of the lash element to lash contact on the driving side of the lash element occurs due to the engine torque ramping up subsequent to engagement of the second rotating clutch. It will be understood that this transition 590 in lash contact results in the transmission clunk within area 570 shown in plot 506. As aforementioned, the transmission clunk is undesirable because it affects drivability.

FIG. 6 graphically illustrates experimental and derived data depicting an engine start event utilizing an overshoot engine speed ramping profile for a powertrain system, e.g., the powertrain system 10 described with reference to FIG. 1-1, in accordance with the present disclosure. The overshoot engine speed ramping profile is described with reference to the overshoot engine speed ramping profile 405 of FIG. 4. The horizontal x-axis in each of plots 602, 604, 606 and 608 denotes time in seconds. It will be appreciated that plots 602, 604, 606 and 608 depict observations of the same data as respective plots 502, 504, 506 and 508 of FIG. 5. Therefore, like numerals refer to like elements of FIG. 5, unless otherwise stated.

The speed profile 620 of the engine speed is the overshoot engine speed ramping profile. As aforementioned, the desired engine speed, i.e., the synchronized engine input speed, can be determined based on the output speed profile 622 and the desired fixed gear ratio utilizing Eq. [1]. Accordingly, the speed profile 620 of the engine speed (i.e., the overshoot engine speed ramping profile) is configured to overshoot the desired engine speed. Referring to plot 604 at dotted vertical line 603, the second rotating clutch is engaged as depicted by the torque profile 641 of the second rotating clutch having a maximum torque capacity. Utilizing the overshoot engine speed ramping profile, the second rotating clutch is engaged after the speed profile 620 of the engine speed is greater than the desired engine speed. In one embodiment, the second rotating clutch is engaged after the engine speed exceeds the desired engine speed by a predetermined magnitude. In a non-limiting example, the engine speed exceeds the desired engine speed by a predetermined magnitude of 50 RPM.

Referring to plot 608, area 690 illustrates a transition from lash contact on the braking side of the lash element to lash contact on the driving side of the lash element is not present when the engine torque ramps up subsequent to engagement of the second rotating clutch at dashed vertical line 603 because lash contact on the driving side has already occurred prior engagement of the second rotating clutch at about 1.9 seconds due to the utilization of the overshoot engine speed ramping profile. Accordingly, because the area 690 illustrates the transition in lash contact is not present, transmission clunk is eliminated within area 670 shown in plot 606.

Figure 7:
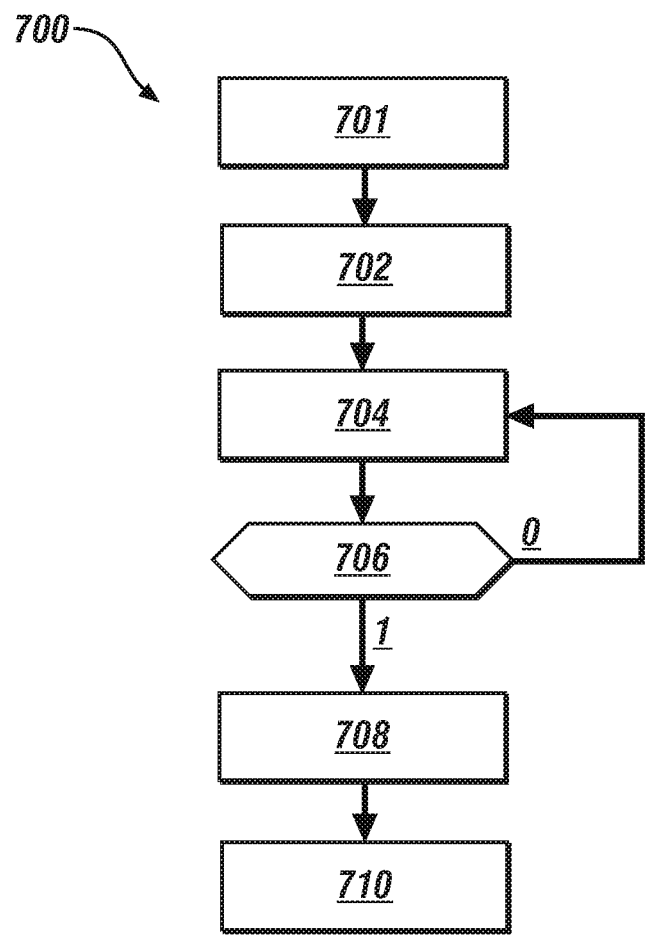
FIG. 7 illustrates an exemplary flowchart 700 for starting an internal combustion engine of a transmission including a selectable clutch device effective when engaged to mechanically couple the engine to a first axle at a fixed engine speed to axle speed ratio, in accordance with the present disclosure.

FIG. 7 illustrates an exemplary flowchart 700 for starting an internal combustion engine of a transmission including a selectable clutch device effective when engaged to mechanically couple the engine to a first axle at a fixed engine speed to axle speed ratio, in accordance with the present disclosure. The exemplary flowchart 700 can be implemented within the control module 5 illustrated in FIG. 1-1. The flowchart 700 is described with reference to the hybrid powertrain system 10 of FIG. 1-1 and the exemplary overshoot engine speed ramping profile 405 of FIG. 4. Table 1 is provided as a key to FIG. 7 wherein the numerically labeled blocks and the corresponding functions are set forth as follows.

TABLE 1

| BLOCK | BLOCK CONTENTS |
|---|---|
| 701 | Start. |
| 702 | Monitor an output torque request and vehicle speed. |
| 704 | Operate the hybrid powertrain in an electrical vehicle mode. |
| 706 | Has an engine start event been executed? |
| 708 | Spin and fuel the engine such that engine speed is increased to exceed a desired engine speed. |
| 710 | Engage said selectable clutch device after the engine speed exceeds the desired engine speed. |

The flowchart 700 starts at block 701 and proceeds to block 702 wherein an output torque request and vehicle speed are monitored. The monitored output torque request can be determined by monitoring operator inputs to the accelerator pedal and the brake pedal via the user interface 13. The monitored speed can be determined by monitoring one or more of the sensing devices and the operator torque request. For instance, the vehicle speed can be determined by measuring the rotational velocity of the output shaft of the transmission. At block 704, the powertrain is operating in an electric vehicle (EV) mode. In the EV mode, engine operation is terminated where the engine is in the OFF state or the FCO state, the transmission is commanded to a neutral state, and an electric machine (e.g., first electric machine 18) is controlled to provide tractive torque to a second axle. The electric machine providing tractive torque to the second axle can include the first electric machine 18 mechanically coupled to the second axle. It will be understood that the selectable clutch device is disengaged and the engine is not mechanically coupled to the first axle when the transmission is in the neutral state. In an exemplary embodiment, the first axle includes a front axle and the second axle includes a rear axle. In an alternative embodiment, the first axle includes the rear axle and the second axle includes the front axle.

Referring to decision block 706, it is determined whether an engine start event has been executed. Specifically, decision block 706 determines whether the engine start event has been executed during operation in the EV mode of block 704. Thus, execution of the engine start event occurs when tractive torque is being applied to the second axle by the electric machine, the transmission is in a neutral state, and the engine is in the OFF state or the FCO state. If the engine start event has been executed as denoted by a "1", the flowchart proceeds to block 708. If the engine start event has not been executed as denoted by a "0", the flowchart 700 reverts back to block 704 wherein operation of the powertrain in the EV mode is maintained. In some embodiments, the engine start event can be executed in response to detecting one or more predetermined conditions of the powertrain. For instance, the engine start event can be executed in response to the monitored vehicle speed exceeding a vehicle speed threshold. In another embodiment, the engine start event can be executed in response to the monitored output torque request exceeding an output torque request threshold. In yet another embodiment, the engine start event can be executed in response to a monitored SOC of the ESD falling below a SOC threshold.

Referring to block 708, the engine is spun and fueled such that an engine speed is increased to exceed a desired engine speed. In one embodiment, a second electric machine (e.g., second electric machine 16) coupled to a crankshaft of the engine functions as a starter for spinning and cranking the engine during execution of the engine start event. In another embodiment, a starter motor is utilized for spinning and cranking the engine. Specifically, the engine speed is increased according to the overshoot engine speed ramping profile 405 of FIG. 4. The desired engine speed is selected to enable synchronization of the selectable clutch device to achieve the desired fixed gear ratio effective when the selectable clutch device is engaged. The desired fixed gear ratio includes a respective fixed gear state of the transmission that is determined based on the monitored output torque request and the monitored vehicle speed. Accordingly, the desired engine speed (e.g., synchronized engine input speed) can be expressed utilizing Eq. 1. Likewise, the desired fixed gear ratio can be expressed as a desired fixed engine speed to axle speed.

Referring to block 710, the selectable clutch device is engaged after the engine speed exceeds the desired engine speed. In one embodiment, the selectable clutch device is engaged when the engine speed exceeds the desired engine speed by a predetermined magnitude. In a non-limiting embodiment, the predetermined magnitude is 50 RPM. Accordingly, a transition from lash contact on the braking side of the lash element (e.g., lash element 80 of FIGS. 2 and 3) to lash contact on the driving side of the lash element is not present when the engine torque ramps up subsequent to engagement of the selectable clutch device because lash contact on the driving side has already occurred prior to engagement of the selectable clutch due to the engine speed exceeding the desired engine speed.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for starting an internal combustion engine of a hybrid powertrain system including a transmission having a selectable clutch device effective when engaged to mechanically couple the engine to a first axle at a fixed engine speed to axle speed ratio, comprising:
   executing an engine start event comprising:
       spinning and fueling the engine such that an engine speed to axle speed ratio exceeds the fixed engine speed to axle speed ratio; and
       engaging said selectable clutch device after the engine speed to axle speed ratio exceeds the fixed engine speed to axle speed ratio.

2. The method of claim 1, wherein the fixed engine speed to axle speed ratio corresponds to a desired fixed gear ratio of the transmission that is based on a monitored output torque request and a monitored vehicle speed.

3. The method of claim 1, wherein the transmission is in a neutral state and tractive torque is provided to one of the first axle and a second axle by an electric machine when the engine start event is executed.

4. The method of claim 3, wherein the selectable clutch device is disengaged and the engine is not mechanically coupled to the first axle when the transmission is in the neutral state.

5. The method of claim 3, wherein the first axle comprises one of a front axle and a rear axle and the second axle comprises the other one of the front axle and the rear axle.

6. The method of claim 1, wherein engaging said selectable clutch device after the engine speed to axle speed ratio exceeds the fixed engine speed to axle speed ratio comprises:
   engaging said selectable clutch device after the engine speed to axle speed ratio exceeds the fixed engine speed to axle speed ratio by a predetermined magnitude.

7. The method of claim 1, wherein the engine start event is executed in response to a monitored vehicle speed exceeding a predetermined vehicle speed.

8. The method of claim 1, wherein the engine start event is executed in response to a monitored output torque request exceeding a predetermined output torque request.

9. The method of claim 1, wherein the engine start event is executed in response to a monitored state of charge (SOC) of an electrical energy storage device (ESD) falling below a predetermined SOC, the ESD configured to provide power to an electric machine for generating tractive torque provided to one of the first axle and a second axle.

10. Method for starting an internal combustion engine of a powertrain system including a hybrid transmission having a selectable clutch device effective when engaged to mechanically couple the engine to a first axle at a desired fixed gear ratio, comprising:
    monitoring an output torque request and a vehicle speed;
    operating the hybrid transmission in an electric vehicle mode comprising:
        terminating engine operation,
        commanding the transmission to a neutral state, and
        controlling an electric machine to provide tractive torque to a second axle;
    executing an engine start event in response to detecting a predetermined condition during operation in the electric vehicle mode, said engine start event comprising:
        spinning and fueling the engine such that engine speed is increased to exceed a predetermined engine speed to enable synchronization of the selectable clutch device and to achieve the desired fixed gear ratio effective when the selectable clutch device is engaged; and
        engaging said selectable clutch device after the engine speed exceeds the predetermined engine speed.

11. The method of claim 10, wherein engaging said selectable clutch device after the engine speed exceeds the predetermined engine speed comprises:
    engaging said selectable clutch device after the engine speed exceeds the predetermined engine speed by a predetermined magnitude.

12. The method of claim 10, further comprising:
    subsequent to engaging said selectable clutch device, providing tractive torque from the engine to the first axle at the desired fixed gear ratio.

13. The method of claim 10, further comprising:
subsequent to engaging said selectable clutch device, providing tractive torque from the engine to the first axle at the desired fixed gear ratio and providing an assisted tractive torque from the electric machine to the second axle.

14. The method of claim 10, wherein the predetermined condition is detected when the monitored vehicle speed exceeds a predetermined vehicle speed.

15. The method of claim 10, wherein the predetermined condition is detected when the monitored output torque request exceeds a predetermined output torque request.

16. The method of claim 10, wherein the predetermined condition is detected when a monitored state of charge (SOC) of an electric energy storage device (ESD) is less than a predetermined SOC, the ESD providing power to the electric machine for generating an assisted tractive torque provided to a second axle.

17. Apparatus, comprising:
an internal combustion engine;
a transmission including a selectable clutch device effective when engaged to mechanically couple the engine to a first axle at a fixed engine speed to axle speed ratio;
a first electric machine mechanically coupled to a second axle and configured to provide tractive torque to the second axle;
an electrical energy storage device (ESD) configured to provide power to the first electric machine; and
a control module:
monitoring an operator torque request, vehicle speed, and a state of charge (SOC) of the ESD;
terminating engine operation, commanding the transmission to a neutral state, and controlling the electric machine to provide tractive torque to the second axle; and
executing an engine start event in response to detecting a predetermined condition when the transmission is in the neutral state and tractive torque is provided to the second axle by the first electric machine, said engine start event comprising:
spinning and fueling the engine such that an engine speed to axle speed ratio exceeds the fixed engine speed to axle speed ratio; and
engaging said selectable clutch device after the engine speed to axle speed ratio exceeding the fixed engine speed to axle speed ratio by a predetermined magnitude.

18. The apparatus of claim 17, further comprising:
a second electric machine configured to convert mechanical power from the engine to electric energy for storage in the ESD and spin the engine in response to executing the engine start event.

19. The apparatus of claim 17, wherein the predetermined condition is detected when at least one of:
the monitored vehicle speed exceeds a predetermined vehicle speed threshold;
the monitored output torque request exceeds a predetermined output torque request; and
the monitored SOC of the ESD is less than a predetermined SOC.

20. The apparatus of claim 17, wherein the fixed engine speed to axle speed ratio corresponds to a desired fixed gear ratio of the transmission based on the monitored output torque request and the monitored vehicle speed.

21. The apparatus of claim 17, wherein the predetermined condition is detected when the monitored vehicle speed exceeds a predetermined vehicle speed threshold.

* * * * *